US009792616B2

(12) United States Patent
Wessels et al.

(10) Patent No.: US 9,792,616 B2
(45) Date of Patent: Oct. 17, 2017

(54) METHOD FOR GENERATING AN ELECTRONIC COUPON, COUPON HOLDING DEVICE, SYSTEM FOR GENERATING AN ELECTRONIC COUPON, ELECTRONIC COUPON AND COMPUTER PROGRAM PRODUCT

(75) Inventors: Jurina Wessels, Starnberg (DE); Frank Dawidowsky, Stuttgart (DE); Stephen Tiedemann, Stuttgart (DE); Klaus Röhrle, Ostfildern (DE); Meik Buscemi, Stuttgart (DE); Dietmar Schill, Winnenden (DE)

(73) Assignee: SONY CORPORATION, Tokyo (JP)

( * ) Notice: Subject to any disclaimer, the term of this patent is extended or adjusted under 35 U.S.C. 154(b) by 859 days.

(21) Appl. No.: 12/472,783

(22) Filed: May 27, 2009

(65) Prior Publication Data
US 2010/0114683 A1  May 6, 2010

(30) Foreign Application Priority Data

Nov. 4, 2008  (EP) .................................... 08019278

(51) Int. Cl.
*H04W 4/12* (2009.01)
*G06Q 30/02* (2012.01)
(52) U.S. Cl.
CPC ......... *G06Q 30/02* (2013.01); *G06Q 30/0207* (2013.01); *G06Q 30/0211* (2013.01); *G06Q 30/0224* (2013.01); *G06Q 30/0236* (2013.01)
(58) Field of Classification Search
CPC .................................................... G06Q 30/00
USPC ....................................................... 705/14
See application file for complete search history.

(56) References Cited

U.S. PATENT DOCUMENTS

| 5,710,886 | A | 1/1998 | Christensen et al. |
| 5,855,007 | A | 12/1998 | Jovicic et al. |
| 6,862,575 | B1 * | 3/2005 | Anttila et al. ............. 705/14.14 |
| 6,969,002 | B2 * | 11/2005 | Creamer .................. G06K 1/12 |
| | | | 235/462.01 |

(Continued)

FOREIGN PATENT DOCUMENTS

CA        1110676       10/1981
EP     1 178 421 A2     2/2002

(Continued)

OTHER PUBLICATIONS

Communication pursuant to Article 94(3) EPC issued Dec. 8, 2010, in Application No. / Patent No. 08019278.4-2221 / 2184710.

(Continued)

*Primary Examiner* — Eric Netzloff
(74) *Attorney, Agent, or Firm* — Oblon, McClelland, Maier & Neustadt, L.L.P.

(57) ABSTRACT

A method is provided for generating an electronic coupon comprising generating coupon identification data; generating coupon metadata; and generating the electronic coupon based on the coupon identification data and based on the coupon metadata. Further, a coupon holding device is provided including a coupon receiving unit configured to receive a first electronic coupon; a coupon metadata generation unit configured to generate coupon metadata for the first electronic coupon; and a coupon generation unit configured to generate a second electronic coupon based on the first electronic coupon and the coupon metadata.

11 Claims, 12 Drawing Sheets

(56) References Cited

U.S. PATENT DOCUMENTS

| | | | |
|---|---|---|---|
| 2002/0035510 A1 | 3/2002 | Nagaishi et al. | |
| 2002/0038246 A1 | 3/2002 | Nagaishi | |
| 2002/0138348 A1 | 9/2002 | Narayan et al. | |
| 2003/0088461 A1 | 5/2003 | Christensen | |
| 2004/0064365 A1 | 4/2004 | Sjoblom et al. | |
| 2004/0177003 A1 | 9/2004 | Liao et al. | |
| 2006/0041469 A1 | 2/2006 | Mathis | |
| 2006/0180664 A1* | 8/2006 | Barrett et al. | 235/383 |
| 2008/0005341 A1 | 1/2008 | Subbian | |
| 2008/0052169 A1 | 2/2008 | O'Shea et al. | |
| 2008/0065488 A1* | 3/2008 | Schwagmann et al. | 705/14 |
| 2008/0065490 A1* | 3/2008 | Novick et al. | 705/14 |
| 2008/0128505 A1* | 6/2008 | Challa et al. | 235/462.13 |
| 2008/0262928 A1* | 10/2008 | Michaelis | 705/14 |
| 2009/0061884 A1* | 3/2009 | Rajan et al. | 455/445 |

FOREIGN PATENT DOCUMENTS

| | | |
|---|---|---|
| EP | 1 622 314 A1 | 2/2006 |
| KR | 2002-0056853 | 7/2002 |
| WO | WO 2004/027662 A1 | 4/2004 |
| WO | WO 2005/064515 A1 | 7/2005 |
| WO | WO 2007/059295 | 5/2007 |

OTHER PUBLICATIONS

Office Action issued Jan. 12, 2012 in European Application No. 08019278.4.

European Office Action dated May 22, 2012, issued in EPO Application No. 08019278.4 filed on Nov. 4, 2008.

Result of Consultation of Mar. 16, 2012, in Application No. 08 019 278.4-2221, filed Nov. 4, 2008.

\* cited by examiner

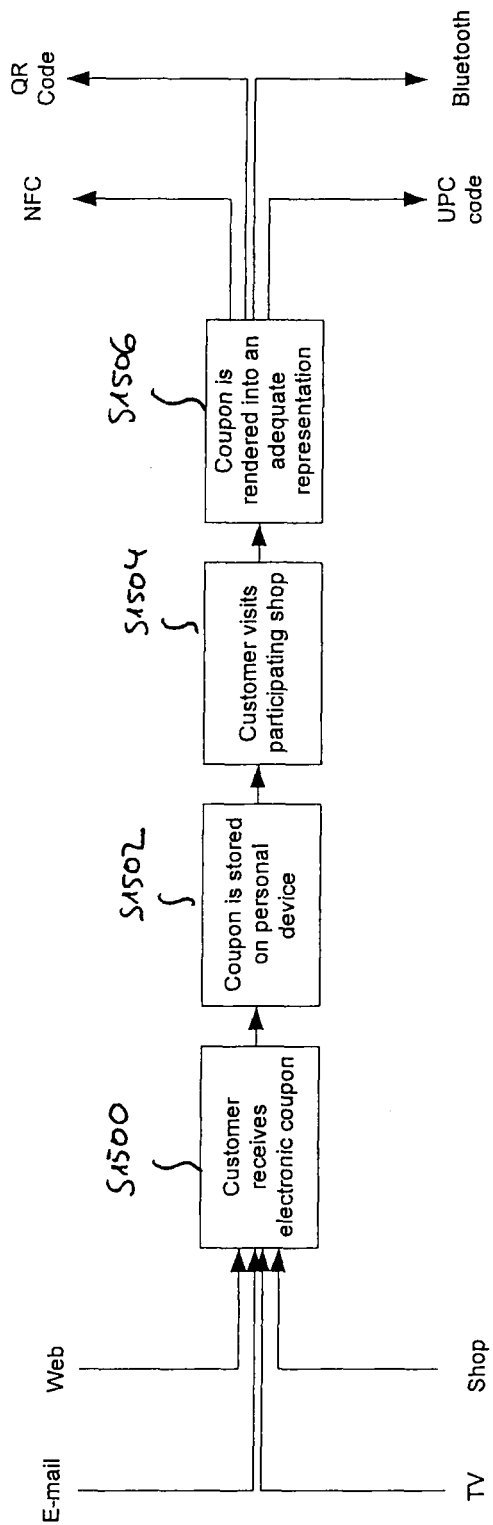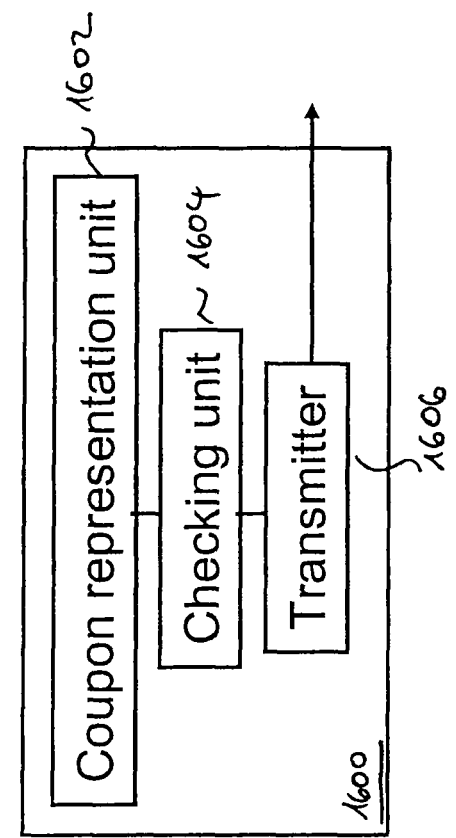

METHOD FOR GENERATING AN ELECTRONIC COUPON, COUPON HOLDING DEVICE, SYSTEM FOR GENERATING AN ELECTRONIC COUPON, ELECTRONIC COUPON AND COMPUTER PROGRAM PRODUCT

An embodiment of the invention relates to a method for generating an electronic coupon, a coupon holding device, a system for generating an electronic coupon, an electronic coupon and a computer program product.

BACKGROUND

Coupons are marketing instruments commonly delivered in form of a ticket or coupons that can be exchanged for a fixed financial discount or rebate when purchasing a product. They are issued by manufacturers of consumer packaged goods or retailers for sales promotions and customer retention.

Today coupons can be distributed via e.g. the following channels: Mail (print and electronic), printed media like magazines and newspapers, internet, mobile devices like mobile phones (via short message service SMS or multi message service MMS).

The coupons are identified in the back-end of a point-of-sale (POS)-terminal through a unique identification number which is commonly printed as number and in form of a one-dimensional or two-dimensional barcode onto the coupon. Upon redemption the coupon identification number is registered at the retailer for further processing either manually or with a laser scanner.

Electronic coupons that are stored on mobile devices are becoming increasingly popular with the increasing usage of digital media. They offer the advertisers the opportunity to address their customers individually.

Across different channels advertisers have different means for measuring the effectiveness of their advertisement channels. The channels might include: Location based services, e.g. fixed terminals or fixed stations for providing advertisement, printed media, broadband TV/radio, in game advertisement, in content advertisement, video on demand, internet, idle screen advertisement, email, SMS/MMS.

Across all advertisement channels advertisers can measure the effectiveness of their advertisement using sampling techniques, customer surveys or by evaluating the turnover increase over the advertisement period. On the internet and for location based advertisement, incentivized consumer actions provide a back channel for advertisers. Broadband TV and radio often provide call-back phone numbers as back channel.

In case of coupon based advertisement campaigns, when coupons are delivered via SMS/MMS, internet, direct mail, and printed media, advertisers can measure coupon conversion rates which are determined from the number of coupons distributed divided by the number of coupons redeemed. This method also provides some information for the advertisers about the time until coupons were redeemed. Depending on the advertisement channel, the accuracy of the received information might be limited.

Currently, coupons are either in a specific physical form (paper coupons) or stored as static data (two-dimensional 2D-barcode, UPC (Universal Product Code) barcode and unique coupon number). With new technologies like Near Field Communication (NFC) coupon transfer is easier and more data can be transferred. However, the introduction of NFC coupon services is facing hurdles, since the number of NFC enabled devices in the market is limited.

Thus, there is need for an improved method and system for generating coupons and for a device to handle coupons.

This object is solved by a method for generating electronic coupons according to claim 1, a coupon holding device according to claim 11, a system for generating an electronic coupon according to claim 16, an electronic coupon according to claim 23, a computer program product according to claim 24, a computer readable storage medium according to claim 25, a method for transmitting an electronic coupon according to claim 26 and a coupon holding device according to claim 27.

Further details of the invention will become apparent from a consideration of the drawings and ensuing description.

BRIEF DESCRIPTION OF THE SEVERAL VIEWS OF THE DRAWINGS

The accompanying drawings are included to provide a further understanding of embodiments and are incorporated in and constitute a part of this specification.

The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 15 shows a schematic diagram for a method according to a further embodiment of the invention, FIG. 16 shows a schematic diagram of a coupon holding device according to a further embodiment of the invention.

DETAILED DESCRIPTION

In the following, embodiments of the invention are described. It is important to note, that all described embodiments in the following may be combined in any way, i.e. there is no limitation that certain described embodiments may not be combined with others. Further, it should be noted that same reference signs throughout the figures denote same or similar elements.

It is to be understood that other embodiments may be utilized and structural or logical changes may be made without departing from the scope of the invention. The following detailed description, therefore, is not to be taken in a limiting sense, and the scope of the present invention is defined by the appended claims.

It is to be understood that the features of the various embodiments described herein may be combined with each other, unless specifically noted otherwise.

Figure 1:
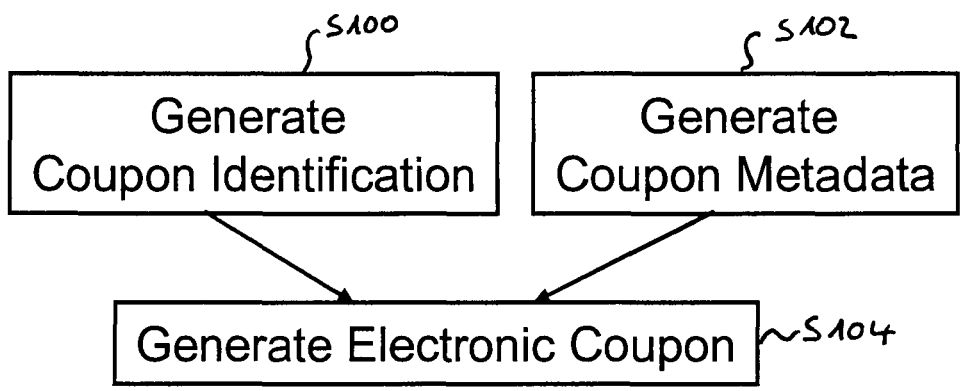
FIG. 1 shows a schematic diagram for a method according to an embodiment of the invention.

In FIG. 1 a schematic diagram for a method for generating an electronic coupon is depicted. In a step S100 a coupon identification is generated. The coupon identification might be an individual identification for each electronic coupon, however, it is also possible that the coupon identification might be the same for a plurality of coupons that belong to a same advertisement campaign or to a same issuer.

In a step S102 coupon metadata is generated. The coupon metadata might include, but is not restricted to a redemption value or multiple redemption values of the electronic coupon, information about the advertisement channel that is used for distributing the electronic coupon, or further information about possible further actions that can be performed by the consumer after receiving the electronic coupon. It might also be possible that the coupon metadata include the time of delivery, the time of acceptance, the customer status, restrictions or benefits on redistribution, time of validity, range of subsidized products, additional indications to initiate other applications (e.g. an application that asks the user to disclose more information in order to receive more benefits).

The coupon metadata might be changed later, e.g. for adding demographic data of the consumer or for other additional information. Demographic data of the consumer might include but is not restricted to gender, age, place of residence, etc.

Throughout this specification the wording "consumer" refers to a person that receives the coupon and might later redeem it. The "consumer" might also be referred to as "customer" or "user".

In a step S104 the coupon identification and the coupon metadata are used to generate an electronic coupon. The generation might be performed by simply grouping the coupon identification and the coupon metadata together in one data file, however, more elaborate schemes, e.g. generating a new coupon identification based on the coupon metadata might be employed as well. In addition, it should be noted that a plurality of different types of coupon metadata might be used, e.g. it is possible to add the redemption value as well as the advertisement channel to the coupon identification in order to generate the electronic coupon.

The coupon metadata might turn the electronic coupon into a dynamic coupon upon consumer's choice after collection of the electronic coupon. The coupon metadata may be added to the coupon identification prior to the distribution of the electronic coupon via the advertiser.

It is possible to modify the redemption value of the electronic coupon from a first redemption value to a second redemption value based on an indication from a consumer's action. The second redemption value can afterwards be used to generate the coupon metadata. The term "modifying" might also include selecting one of a plurality of redemption values that are stored beforehand e.g. in the coupon metadata. Therefore, the second redemption value is reflected in the coupon metadata. However, it should be mentioned that the generation of the coupon metadata might not only be based on the second redemption value, but might be based as well on other information or data processing algorithms.

Figure 2:
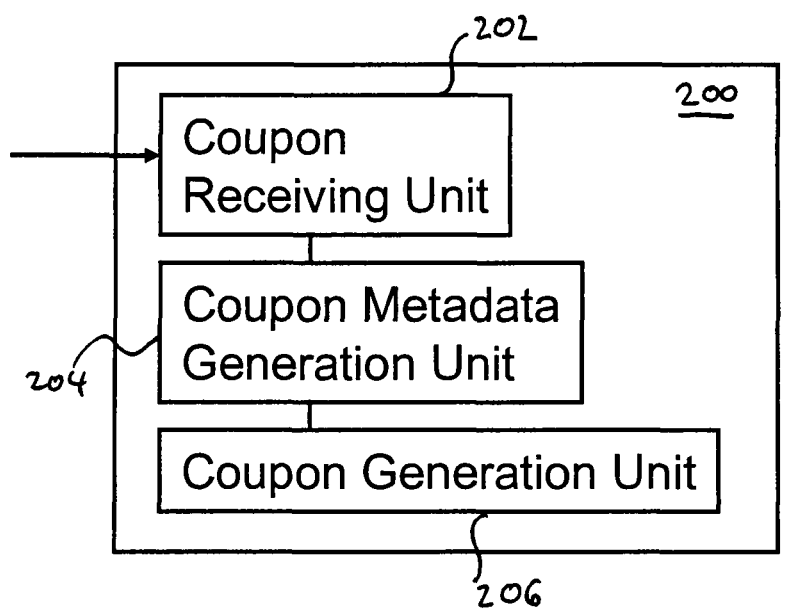
FIG. 2 shows schematically a coupon holding devices according to a further embodiment of the invention.

In FIG. 2 a schematic diagram of a coupon holding device 200 is depicted. The coupon holding device includes a coupon receiving unit 202, a coupon metadata generation unit 204 and a coupon generation unit 206.

The coupon holding device 200 might be a device which is used by a consumer in order to store an electronic coupon. The coupon holding device 200 might be a mobile electronic device, e.g. a mobile or cellular phone, a personal digital assistant (PDA) or a notebook.

The coupon receiving unit 202 might be a receiver that is capable of receiving an electronic coupon or at least a coupon identification via any of the following advertisement channels: printed media, location based services, broadband TV/Radio, in-game advertisement, in-content advertisement, video on demand, internet, idle screen advertisement, email, SMS/MMS, NFC. In order to receive a coupon via non-electronic media, e.g. printed media, the coupon receiving unit might be equipped with a camera in order to take a photo of the coupon or at least of the coupon identification (e.g. a one-dimensional or two-dimensional barcode).

The coupon metadata generation unit 204 is configured to generate the coupon metadata. Therefore, the coupon metadata generation unit might include a software application which is started based on e.g. coupon metadata of a received first electronic coupon. The software application might be configured to generate an input mechanism, e.g. a display together with key functions of the coupon holding device, for the indication of a consumer's action in order to change the redemption value of the electronic coupon.

Figure 3:
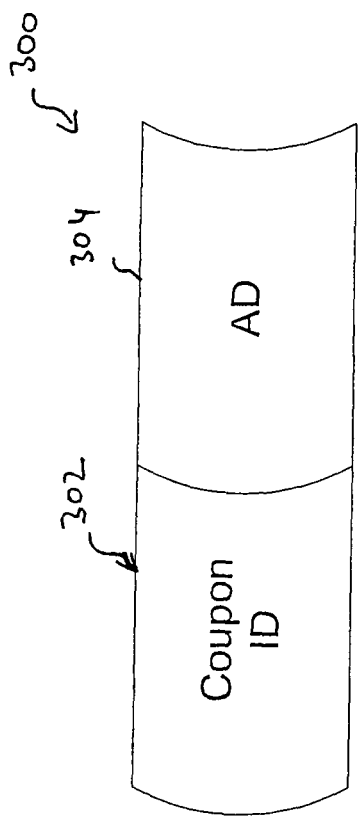
FIG. 3 shows a schematic diagram for an electronic coupon according to a further embodiment of the invention.

In FIG. 3 an electronic coupon 300 is depicted, which includes a coupon identification (Coupon ID) 302 and coupon metadata 304 or additional data (AD).

Figure 4:
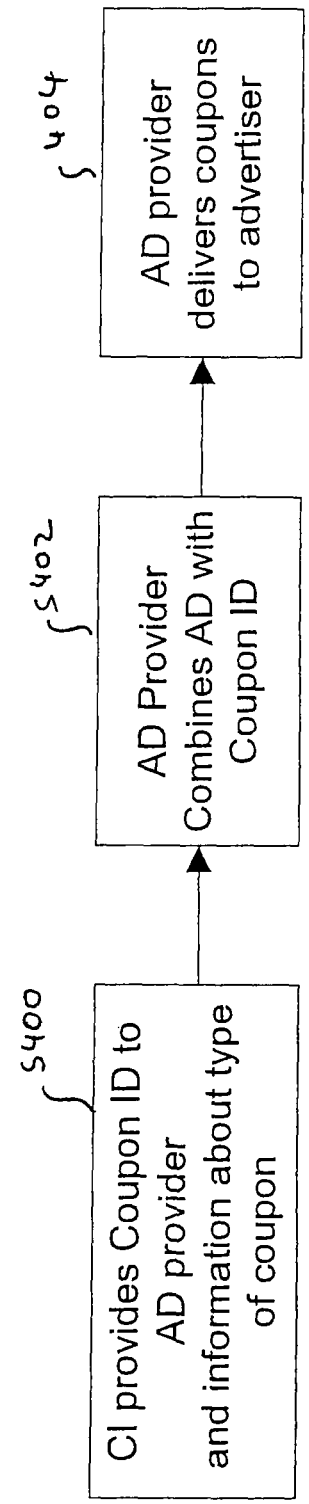
FIG. 4 shows a schematic diagram for a method according to a further embodiment of the invention.

As is depicted in FIG. 4 in a step S400 a coupon identification provider (CI) provides the coupon identification (ID) to an additional data (AD) provider and information about the type of the coupon. In a step S402 an additional data provider combines the coupon metadata with the coupon identification and afterwards delivers the electronic coupons to an advertiser in a step S404. Thus, the coupon metadata or additional data is added to the coupon identification data prior to the distribution of the combined electronic coupon via the advertiser.

The coupon identification provider (CI) and the additional data (AD) provider might be the same entity.

Based on the coupon metadata, e.g. a type of the coupon metadata, the coupon holding device 200 might start different applications indicating to the consumer that the redemption value of the collected electronic coupon is dynamic, i.e. that the value can increase or decrease upon defined actions taken by the consumer. The actions of the consumer might include one or any combination of linking the electronic coupon to customer demographic data via a consumer identification ID, electronic coupon multiplication within the social network of a consumer, electronic coupon transfer within the social network of the consumer, coupon redemption within a given time frame or providing additional information to the coupon provider. It is also possible that the applications indicate to the consumer that the redemption value is static.

Figure 5:
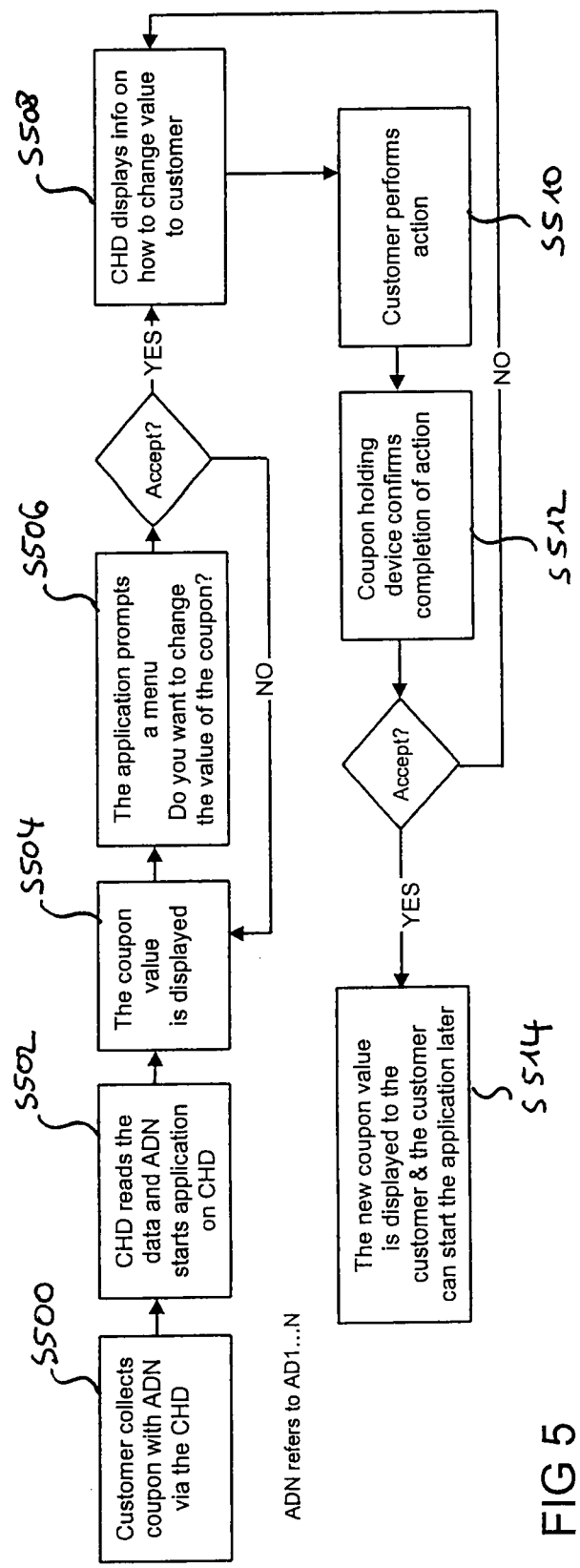
FIG. 5 shows a schematic diagram for a method according to a further embodiment of the invention.

In FIG. 5 it is depicted that after collecting the electronic coupon with coupon metadata with the coupon holding device 200 in a step S500, the consumer can decide if he wants to take any of these actions prior to coupon redemption using the coupon holding device 200. In a step S502 the coupon holding device 200 reads the data of the received electronic coupon and starts the software application based on the coupon metadata. In a step S504 the redemption value of the electronic coupon is displayed. If the consumer decides to take one or more of the offered actions, the coupon holding device 200 might prompt a menu to the consumer that enables the consumer to perform the action in a step S506. The menu might provide an input mechanism for a consumer's action, e.g. a display might provide touch-keys for giving a consumer an opportunity to enter his actions into the coupon holding device 200. The coupon holding device 200 might display information on how to enhance the redemption value to the consumer in a step S508. Possible actions of the consumer in a step S510 are registered by the coupon holding device 200 and upon completion of the action the coupon holding device 200 confirms completion of the action in a step S512 and the new coupon redemption value is displayed to the consumer in a step S514. The consumer might perform many of such actions and he also might undo any performed action before redemption of the coupon. An update of the menus might be performed as well.

After redemption at e.g. a point-of-sale, the coupon might be transferred to the advertiser or to a service provider that acts for the advertiser for evaluating the coupon metadata. The advertiser might be referred to throughout this specificational so as "back-end".

Figure 6:
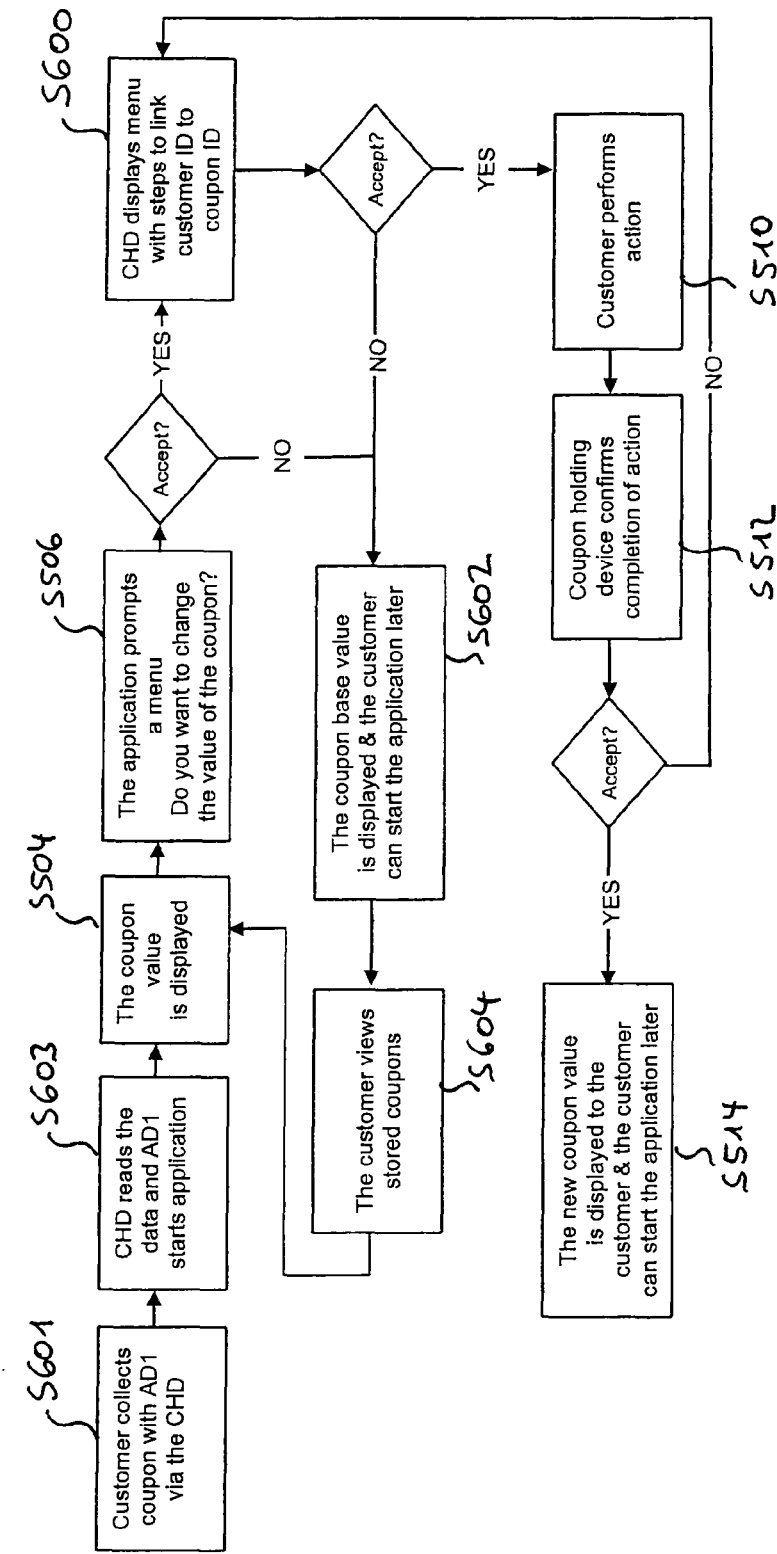
FIG. 6 shows a schematic diagram for a method according to a further embodiment of the invention.

In FIG. 6 a method is schematically depicted in which the consumer links demographic data to the coupon identification. After collecting in S601 a coupon with first coupon metadata AD1 that indicates that the redemption value of this coupon might be changed by adding the consumer identification to the coupon metadata, the coupon holding device 200 reads the data and the first coupon metadata AD1 leads to execution of the application on the coupon holding device 200 in S603. In a step S600 the coupon holding device displays a menu with steps to link the consumer identification to the coupon identification. Thus, the consumer has the possibility to enhance the redemption value by providing demographic data to the advertiser upon redemption at the point-of-sale POS. If the user accepts this linkage then the redemption value is enhanced as is explained with reference to FIG. 5. However, if the consumer decides that he is not willing to link his consumer identification to the coupon identification then in a step S602 the base or first redemption value is displayed on the coupon holding device 200 and the consumer can start the application later. It might be possible that the consumer can view a list of stored electronic coupons in a step S604. After redemption of the coupon, at least the coupon metadata might be transferred back to the advertiser or back-end e.g. for deriving the customer identification from the coupon metadata.

Figure 7:
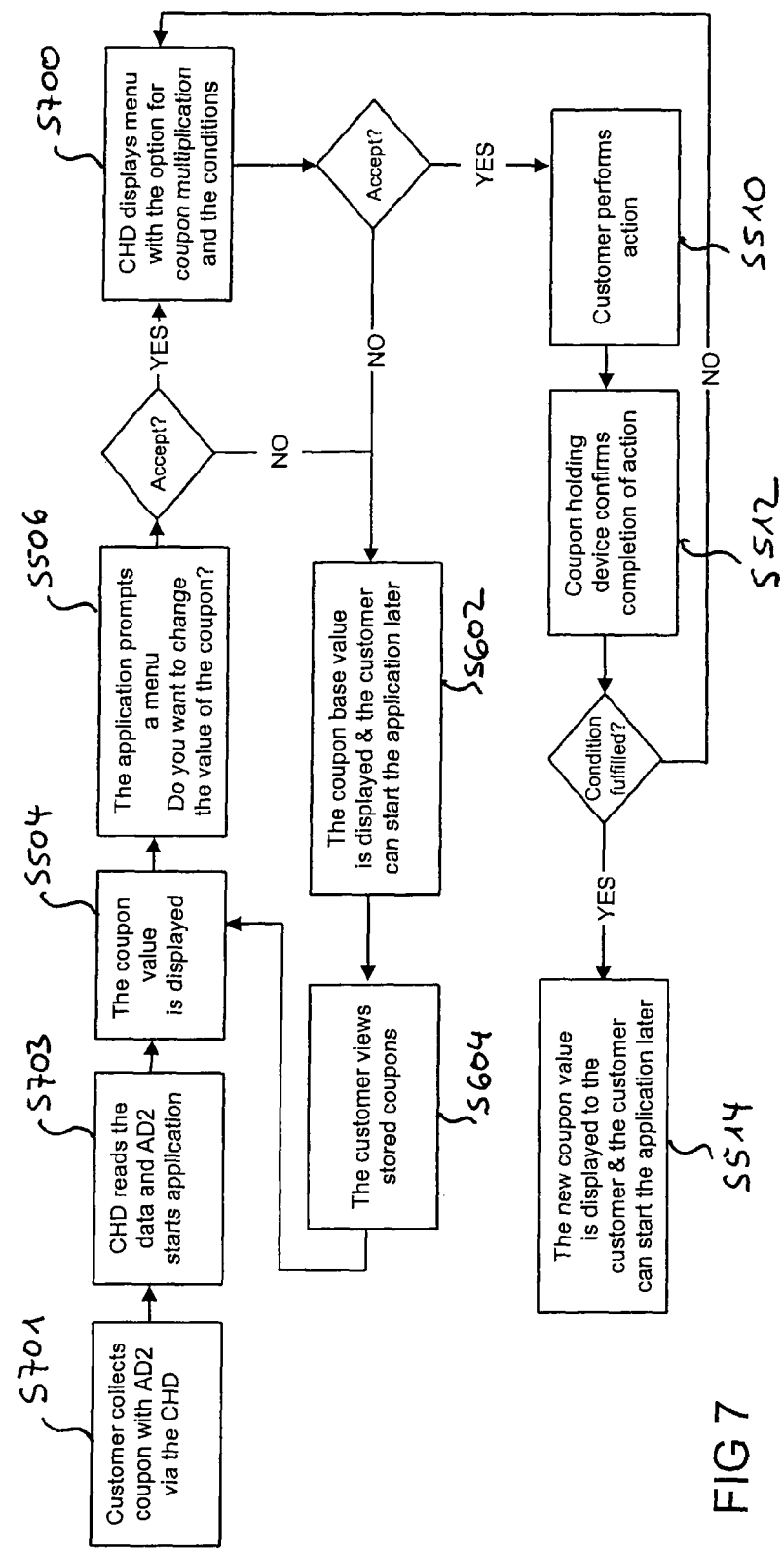
FIG. 7 shows a schematic diagram for a method according to a further embodiment of the invention.

In FIG. 7 a method is schematically depicted for a further embodiment of the invention. After collecting in S701 a coupon with second coupon metadata AD2 that indicates that the redemption value of this coupon might be changed by distributing the coupon within the social network of the consumer, the coupon holding device 200 reads the data and the second coupon metadata AD2 leads to execution of the application on the coupon holding device 200 in S703. In a step S700 the coupon holding device prompts to the consumer a menu informing the consumer about the possibility to change the coupon value by multiplying the electronic coupon within the social network of the consumer. Different embodiments might be possible, e.g. the multiplication to a predefined number of people in the social network using a predefined distribution channel, e.g. portable electronic devices, like mobile or cellular phone, internet, game console or non-mobile electronic devices. Further, it might be possible that the consumer links his identification to the coupon identification prior to distribution within his social network. Thereafter, the electronic coupon is multiplied to a predefined number of people in the social network and the consumer might receive high value electronic coupons after redemption of the multiplied electronic coupons if the people of the social network who received a coupon linked their consumer identification also to the electronic coupon prior to redemption of their copy of the electronic coupon. After redemption of the coupons, the coupon metadata might be transferred back to the advertiser or back-end e.g. for deriving the customer identifications of the original electronic coupon and the distributed electronic coupons.

Figure 8:
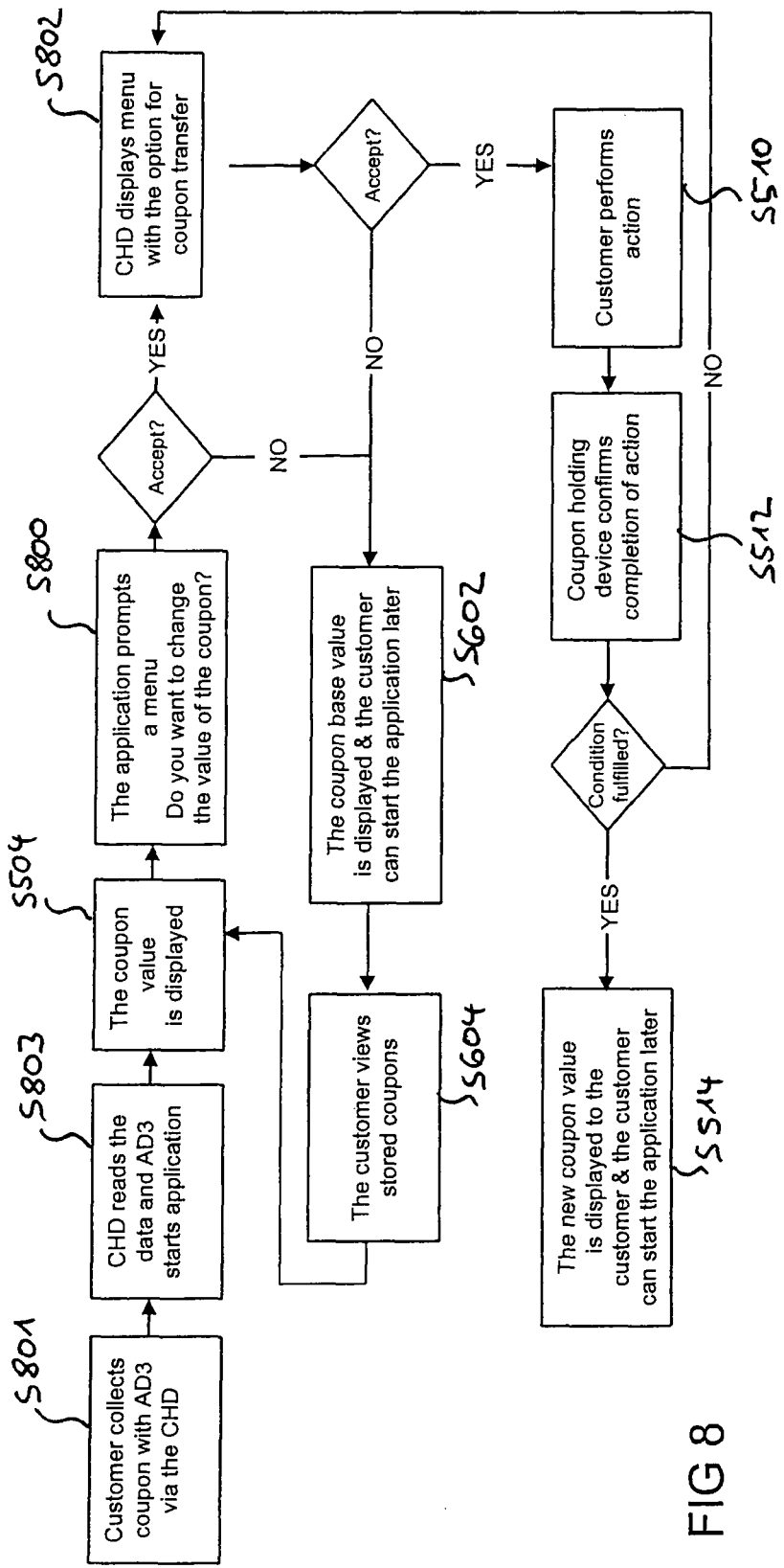
FIG. 8 shows a schematic diagram for a method according to a further embodiment of the invention.

In FIG. 8 a method is schematically depicted for a coupon transfer within the social network of the consumer. After collecting in S801 a coupon with third coupon metadata AD3 that indicates that the redemption value of this coupon might be changed by transferring the coupon to one person within the social network of the consumer, the coupon holding device 200 reads the data and the third coupon metadata AD3 leads to execution of the application on the coupon holding device 200 in S803. In a step S800 the coupon holding device prompts a menu informing the consumer about the possibility to transfer the coupon within his social network. In a further step S802 the coupon holding device 200 (CHD) displays a menu with the option for coupon transfer. Transfer of the coupon might lead to an increase or to a decrease of the redemption value. After redemption of the coupon, the coupon metadata might be transferred back to the advertiser or back-end for deriving e.g. the customer identification of the redeemed coupon.

Figure 9:
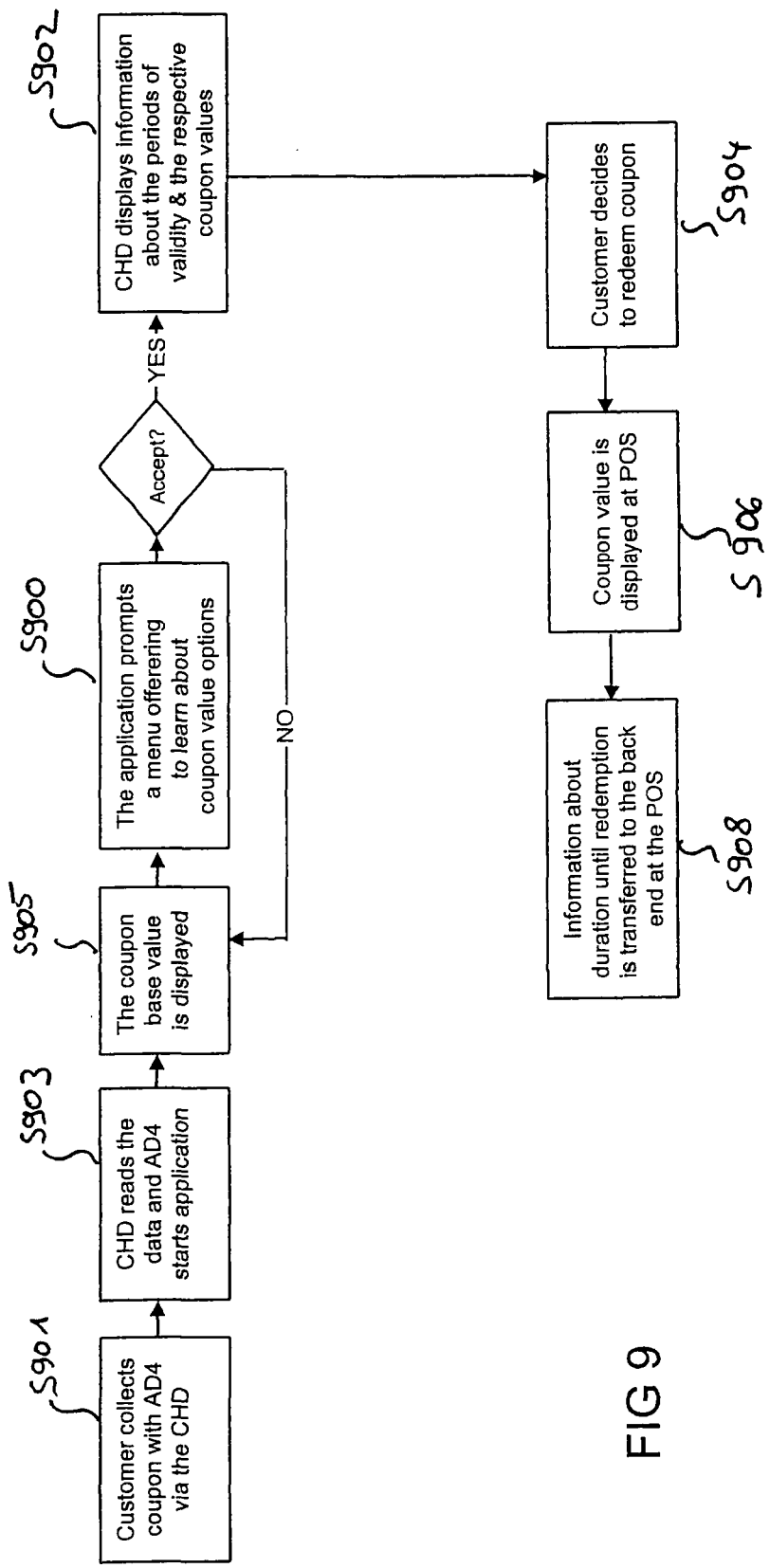
FIG. 9 shows a schematic diagram for a method according to a further embodiment of the invention.

In FIG. 9 a method is schematically depicted for a redemption value that is depending on the duration between collection of the electronic coupon and the redemption of the coupon. After collecting in S901 a coupon with fourth coupon metadata AD4 that indicates that the redemption value of this coupon might be changed, the coupon holding device 200 reads the data and the fourth coupon metadata AD4 leads to execution of the application on the coupon holding device 200 in S903. Afterwards the coupon base value is displayed in a step S905. In a step S900 the software application of the coupon holding device 200 prompts a menu offering to learn about redemption value options. If the consumer agrees, in a step S902 a menu is prompted to the consumer that encourages fast redemption by offering redemption values that depend on the duration between collection and redemption. Electronic coupons may offer one or more values according to one or more time periods defined by the advertiser. After the consumer decides to redeem the electronic coupon in a step S904 the redemption value is displayed at the point-of-sale POS at a step S906. For providing information about the duration until redemption this information is transferred to a back-end, e.g. an evaluating server of the advertiser at the point-of-sale POS in a step S908.

Figure 10:
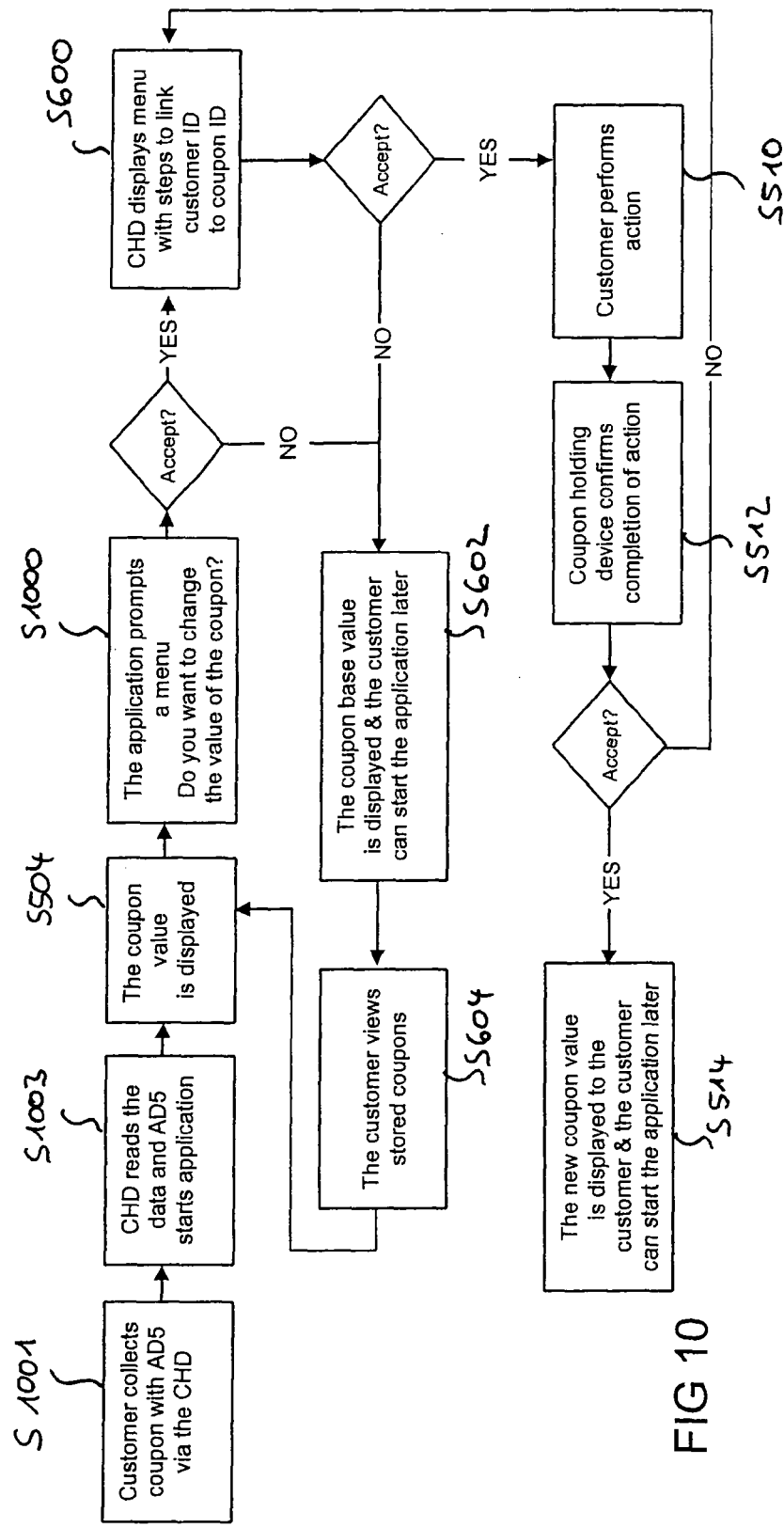
FIG. 10 shows a schematic diagram for a method according to a further embodiment of the invention.

In FIG. 10 a further method as an embodiment of the invention is depicted. After collecting in S1001 a coupon with fifth coupon metadata AD5 that indicates that the redemption value of this coupon might be changed by accepting further advertisement from partner companies to the coupon metadata, the coupon holding device 200 reads the data and the fifth coupon metadata AD5 leads to execution of the application on the coupon holding device 200 in S1003. In step S1000 the coupon holding device 200 prompts to the consumer a menu informing the consumer about the possibility to enhance the coupon value by accepting future advertisements from partner companies. This information is then included in the coupon metadata and transferred to the evaluating server of the advertiser. After redemption of the coupon, the coupon metadata might be transferred back to the advertiser or back-end for deriving e.g. the customer identification and/or the further demographic data of the redeemed coupon.

The embodiments depicted in FIGS. 6 to 10 might be combined in any way. However, it might also be possible that predetermined electronic coupons might only allow one of (or a restricted number of) the possibilities of FIGS. 6 to 10. Information about the possibilities for the consumer might be stored in advance in the coupon metadata before transferring it to the coupon holding device of the consumer. The coupon holding device might be configured to only display options to the consumer that are allowed for the received electronic coupon based on the respective coupon metadata included.

The information that the advertiser or the service provider receives after redemption of the electronic coupon can be used from the advertiser for further individualized advertisement to the consumer. Further, the information can be used to measure the efficiency of the advertisement channel and/or the advertisement campaign. The consumer identification and possible demographic data of the consumer that might be included in the coupon metadata could be used to derive statistical data, e.g. local distribution, age, gender, income etc. of the consumers who redeemed their electronic coupons.

In FIG. 1a a system 1100 according to a further embodiment is depicted. The system 1100 includes a first server 1102 and a coupon holding device 200. The first server 1102 might be a server situated at an advertiser and might also be referred to as additional data provider. The first server 1102 is configured to generate a first electronic coupon and to transmit the first electronic coupon. The coupon holding device 200 is configured to receive the first electronic coupon. The first server 1102 further includes a coupon metadata generation unit 1104 that is configured to generate coupon metadata. The system 1100 allows the consumer to electronically receive an electronic coupon, e.g. for price reduction on goods or services (or other incentives) when an advertisement is being presented to the consumer via multiple advertisement channels. Timely with the presentation of the advertisement, electronic coupon or electronic coupon data are provided by an electronic device with near field communication (NFC) capabilities or a device connected to a near field communication capable device. An electronic device providing electronic coupons or electronic coupon data might e.g. be realized as an active electronic device including a power suply, and a transmitter and a receiver or as a passive electronic device, e.g. a so-called "tag" without a power supply that is enabled to transmit its stored data to a requesting unit. As it is depicted in FIG. 3 the electronic coupon 300 includes a coupon identification 302 and additional data (AD) or coupon metadata 304. The coupon metadata 304 might include information about the data and time of presentation of the coupon, about the advertisement channel and geographic reach. Depending on the advertisement channel, the coupon metadata 304 might lead to the execution of a software application on the first server that automatically adds information about date and time of delivery. Signature information (e.g. using PKI (Public Key Infrastructure) methods) might also be inserted to allow integrity validation of the coupon metadata.

Figure 11A:
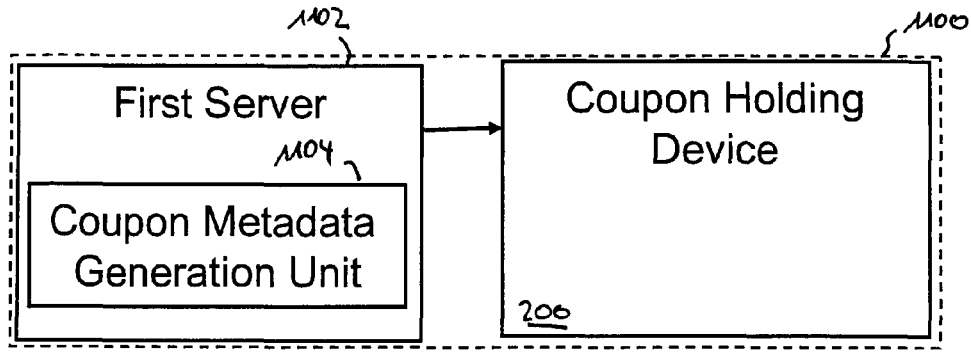
FIGS. 11a and 11b show schematically systems according to a further embodiment of the inventions.
Figure 11B:
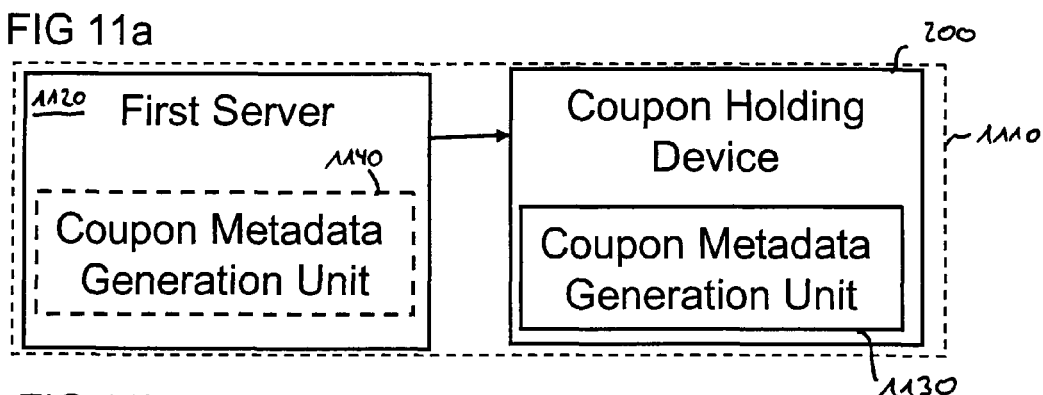

In FIG. 11b a further embodiment of a system 1110 is depicted. The system 1110 includes a first server 1120 and a coupon holding device 200. The first server 1120 might be a server situated at an advertiser and might also be referred to as additional data provider. The first server 1120 is configured to generate a first electronic coupon and to transmit the first electronic coupon. The coupon holding device 200 is configured to receive the first electronic coupon and includes a coupon metadata generation unit 1130 that is configured to generate coupon metadata. The first server 1120 might include a further coupon metadata generation unit 1140 that is configured to generate coupon metadata. The further coupon metadata generation unit 1140 might generate initial coupon metadata, indicating e.g. a first redemption value and the coupon metadata generation unit 1130 might change the coupon metadata by e.g. changing the redemption value of the coupon.

Figure 12:
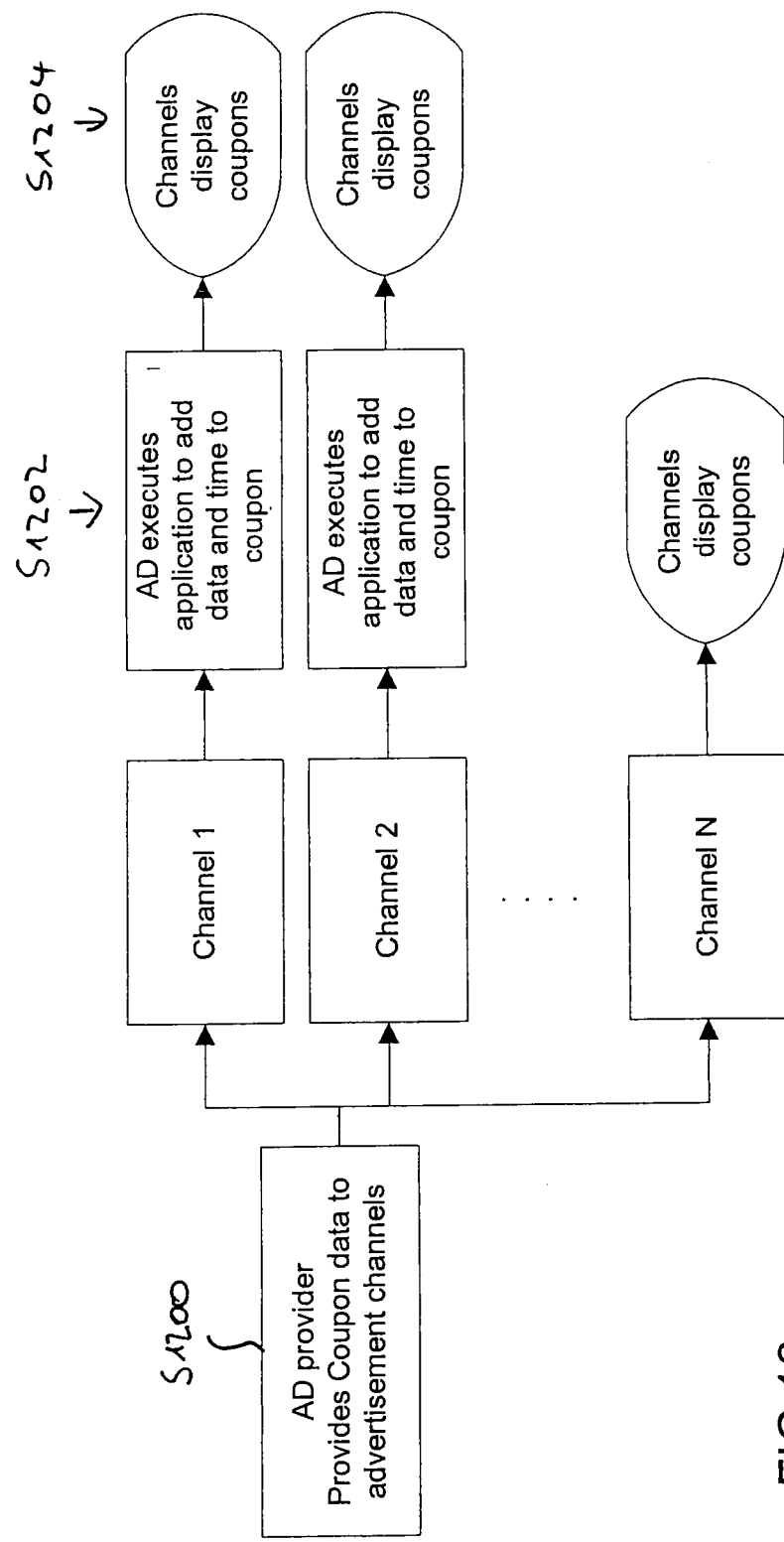
FIG. 12 shows a schematic diagram for a method according to a further embodiment of the invention.

As it is depicted in FIG. 12 the electronic coupons are delivered in a step S1200 by an additional data provider (AD provider) to the different advertisement channels (channel 1, channel 2, . . . , channel N), date and time will be added to the electronic coupons in a step 1202 and the advertisements are displayed in the channels in a step S1204.

Figure 13:
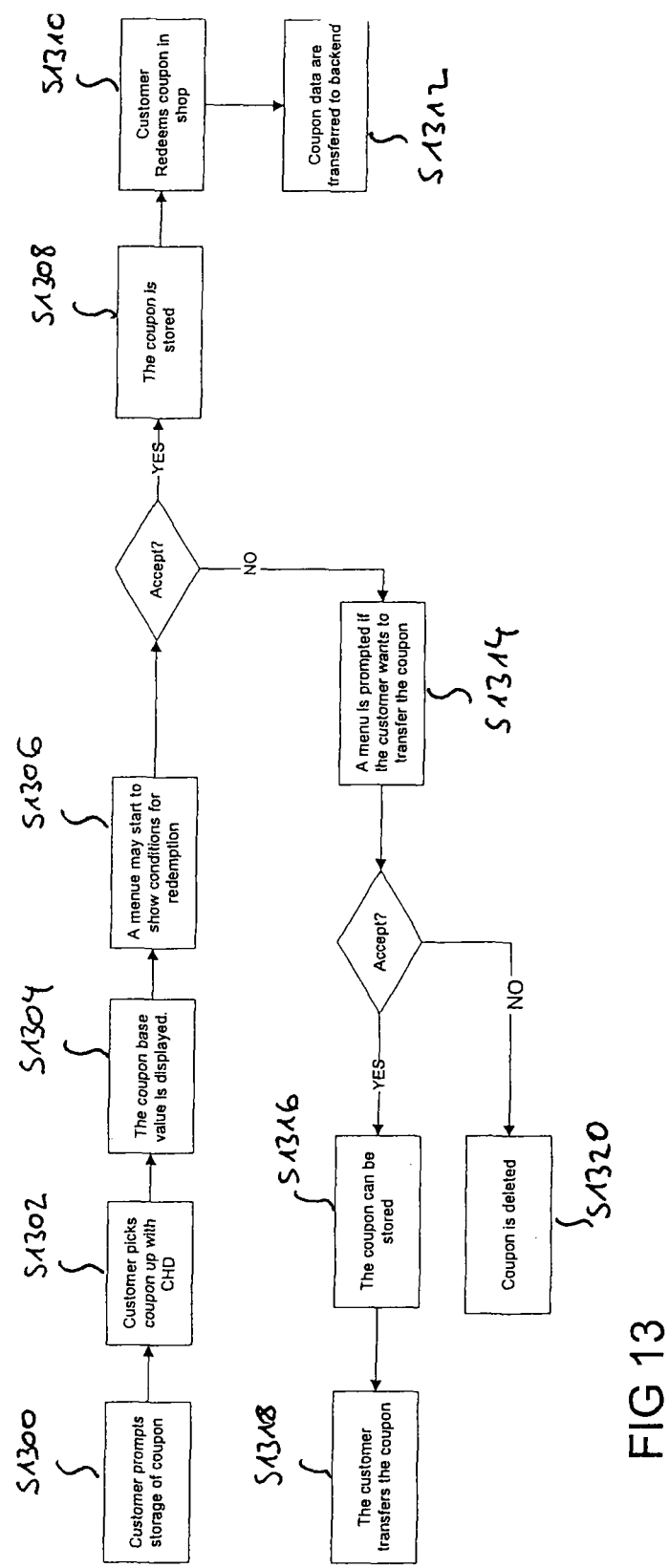
FIG. 13 shows a schematic diagram for a method according to a further embodiment of the invention.

As it is depicted in FIG. 13, the consumer might collect electronic coupons by prompting interest in a step 1300 by e.g. pushing a button on a remote control and the presentation device, e.g. a television set, or an electronic device connected to the presentation device might store/collect such electronic coupons in order to provide an easy delivery of electronic coupon data to the user. The consumer can take possession of the coupon by e.g. bringing a personal near field communication device close to the device providing the electronic coupon data over a certain time. After collection of the electronic coupon with a coupon holding device 200 in step S1302 the first redemption value is displayed in step S1304 and the consumer may be prompted a menu with information about conditions for coupon redemption (time frame, available stores or retailers, online or real world purchases, etc.) in step S1306. The consumer can decide to keep the electronic coupon with storing the coupon in step S1308 and redeeming the coupon in step S1310. Then the coupon data is transferred to the back end, e.g. an evaluation server of the advertiser in step S1312. If permitted, the customer can be asked to transfer the coupon in step S1314. Depending on the customer's decision, the coupon data is stored in step S1316 and transferred in step S1318 or the coupon data is deleted in step S1320.

This embodiment enables advertisers to deliver with the advertisement electronic coupons across all advertisement channels. The electronic coupon contains, in addition to, e.g. a unique coupon identification based on the EPC (Electronic Product Code) standard, substantially more information data such as date/time of presentation, date/time of reception by the consumer's premises, and advertisement channel information. Upon redemption, the information from the coupons can be retrieved by the advertisers, establishing a new and effective back channel for a plurality of different advertisement channels.

With this embodiment of the invention a new back channel for selected advertisement channels is provided. The back channel can provide additional information that is currently not accessible for the advertiser. The information can be used to measure the effectiveness of the advertisement channel and/or the advertisement campaign. The consumer identification and possible demographic data of the consumer that might be included in the coupon metadata could be used to derive statistical data, e.g. local distribution, age, gender, income etc. of the consumers who redeemed their electronic coupons.

With its intuitive and easy use for consumers the system has the potential to increase coupon conversion rates. In addition, the system might be used to enhance the interaction of the advertiser with the customer. Further, the system provides a possibility for the advertiser to provide targeted advertisements linked to certain contents, e.g. movies, games, songs, pictures, etc. that are looked at or played by consumers.

Figure 14:
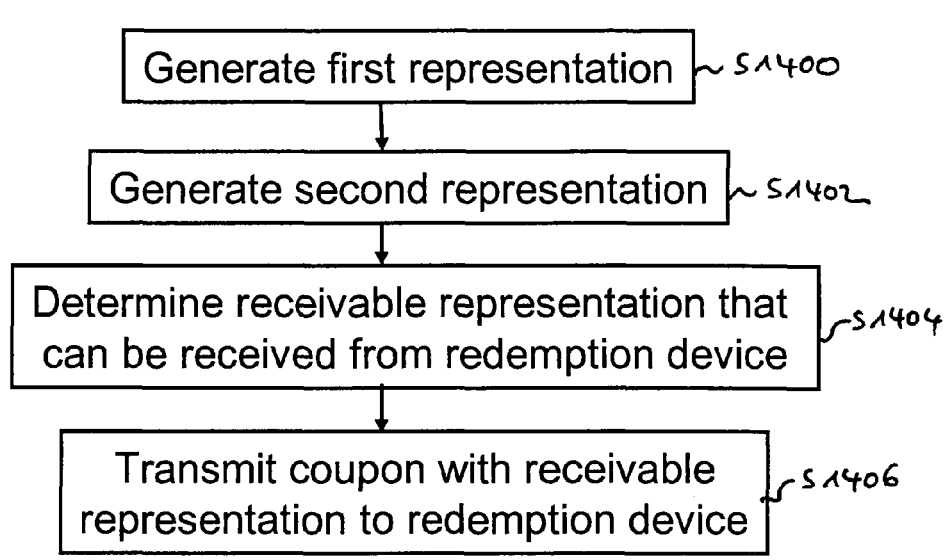
FIG. 14 shows a schematic diagram for a method according to a further embodiment of the invention.

In FIG. 14 a schematic diagram of a further embodiment of the invention is depicted. In a step S1400 a first representation of the electronic coupon is generated. The first representation might be e.g. a one-dimensional barcode, a two-imensional barcode, an electronic data format that can be exchanged using Near Field Communication (NFC), SMS data etc.

In a step S1402 a second representation of the electronic coupon is generated that is different from the first representation. It might be possible to have a first representation which is NFC data and a second representation that is e.g. a one-dimensional barcode.

Then a receivable representation is determined in a step S1404 from the first or second representation that can be received from e.g. a redemption device or terminal at a point-of-sale. The redemption device might be equipped e.g. with a barcode reader, or with an NFC receiver or both.

In a step S1406 the electronic coupon is transmitted in the receivable representation.

With this embodiment the limitation of existing shop infrastructure when introducing electronic coupons that may carry a significant amount of data, is overcome. The coupons are rendered into the physical representation that best fits with the current state of deployment, i.e. in the beginning of an introduction of electronic coupons it will be rendered e.g. as two-dimensional barcodes, and later it might be rendered as Near Field Communication Coupons, but still containing the same or similar information.

The determining of the receivable representation might be performed by transmitting the electronic coupon in the first representation to the redemption device. If no acknowledgement of successful receipt is received after transmitting the electronic coupon in the first representation, then the electronic coupon is transmitted in the second representation. The acknowledgement of successful receipt might be transmitted directly from the redemption device to the coupon holding device or the consumer might check that the first representation was not received by the redemption device and enter manually into the coupon holding device 200 that the first representation was not received.

As it is depicted in FIG. 15, the electronic coupon can be received by the consumer in a step S1500 over a multitude of possible communication channels which include, but are not restricted to SMS, MMS, NFC, Bluetooth, TV broadcasting, internet or barcodes.

The data is stored in the coupon holding device 200 e.g. in a format that is independent of communication technology that is used for reading the coupon in a step S1502. The data can be rendered upon request into a multitude of representations, e.g. two-dimensional barcodes, NFC data, SMS etc. It may also be stored in a central back-end, where the data set is uniquely identified by a coupon number.

The amount of information presented to the coupon reading device is dependent on the communication technology used. For instance, UPC (Universal Product Code) barcodes can contain less information than two-dimensional barcodes. NFC offers the best solution in terms of the amount of data that can be provided. The coupon conversion takes the capabilities of each technologies used for rendering into account and selects the appropriate subset of the overall coupon information for rendering. Depending on the configuration of the coupon holding device 200, the coupon may be rendered using one or multiple technologies (e.g. showing UPC and two-dimensional barcodes simultaneously) in a step S1506 after the consumer visits a participating shop in step S1504. The representations might be Near Field Communication (NFC), Universal Product Code (UPC), Bluetooth or Quick Response (QR) Code, etc.

In FIG. 16 a further embodiment of a coupon holding device 1600 is depicted. It includes a coupon representation unit 1602 configured to generate the first and at least a second representation of the electronic coupon. Further, it includes a checking unit 1604 configured to check which of the first or second representation can be received from a redemption device and a transmitter 1606 configured to transmit the electronic coupon in the first or second representation that can be received from the redemption device.

The rendering might use different technologies sequentially, for instance, starting by using a technology that allows to detect a coupon reading device (e.g. NFC) and then using other technologies (e.g. barcodes) if such detection did not happen in a certain time. In addition, if the chosen technology is too limited to transmit all data (for example, the two-dimensional barcode is not providing enough capacity for the data set), the coupon holding device 1600 might choose to display multiple fragments of the electronic coupon in sequence.

Thus, the physical representation is dynamic and can be adjusted to the environment and ease the introduction hurdle to new services.

Although specific embodiments have been illustrated and described herein, it will be appreciated by those of ordinary skill in the art that a variety of alternative and/or equivalent implementations may be substituted for the specific embodiments shown and described without departing from the scope of the described embodiments. This application is intended to cover any adaptations or variations of the specific embodiments discussed herein. Therefore, it is intended that this invention be limited only by the claims and the equivalents thereof.

The invention claimed is:

1. A method for generating an electronic coupon using a coupon holding device that includes a processor, the method comprising:
   generating coupon identification data;
   generating first coupon metadata, the first coupon metadata including a redemption value and information indicating that the redemption value can be modified by performing at least one of linking a personal identification of a user to the coupon identification data, multiplying a first electronic coupon within a social network of the user, and transferring the first electronic coupon within the social network of the user;
   generating, by the processor of the coupon holding device, the first electronic coupon based on the coupon identification data and based on the first coupon metadata;
   starting a software application on the coupon holding device based on the first coupon
   metadata of the first electronic coupon, the software application generating, based on the information included in the first coupon metadata, an input mechanism into the coupon holding device for receiving of an indication of an action by the user, the action by the user including the at least one of linking the personal identification of the user to the coupon identification data, multiplying the first electronic coupon within the social network of the user, and transferring the first electronic coupon within the social network of the user;

receiving the indication of the action by the user;

modifying the redemption value of the first electronic coupon from a first redemption value to a second redemption value by the coupon holding device based on the indication of the action by the user;

generating second coupon metadata based on the second redemption value by the coupon holding device;

generating, by the processor of the coupon holding device, a second electronic coupon based on the coupon identification data of the first electronic coupon and based on the second coupon metadata by the coupon holding device;

generating, by the processor of the coupon holding device, a first representation for the second electronic coupon, the first representation being in an electronic data format compatible with near field communication (NFC);

generating, by the processor of the coupon holding device after the generating of the first representation that is in the electronic data format compatible with NFC, a second representation for the second electronic coupon, the second representation being in a barcode format and being different from the first representation;

transmitting the second electronic coupon in the first representation, which is in the electronic data format compatible with NFC, to a redemption device, which includes one of a barcode reader and an NFC receiver and is external to the coupon holding device;

dividing, after the generating of the first representation, which is in the electronic data format compatible with NFC, for the second electronic coupon, the second electronic coupon into multiple fragments, in response to the second electronic coupon being in a particular type of second representation; and sequentially transmitting the multiple fragments of the second electronic coupon in the second representation, which is in the barcode format, to the redemption device, when no acknowledgement of successful receipt is received by the coupon holding device directly from the redemption device after transmitting the second electronic coupon in the first representation, which is in the electronic data format compatible with NFC, to the redemption device.

2. The method according to claim 1, wherein the generating second coupon metadata includes receiving a distribution channel identification for distributing the second electronic coupon;

generating the second coupon metadata based on the distribution channel identification; and deriving the distribution channel identification after redemption of the second electronic coupon.

3. The method according to claim 2, further comprising:
evaluating the effectiveness of the distribution channel based on the distribution channel identifications derived after redemption.

4. The method according to claim 1, further comprising:
evaluating the second coupon metadata after redemption of the second electronic coupon.

5. A coupon holding device for storing an electronic coupon by a user, comprising:

a receiver configured to receive a first electronic coupon; and circuitry configured to generate first coupon metadata for the first electronic coupon, the first coupon metadata including information indicating that a redemption value can be modified by performing at least one of linking a personal identification of the user to the coupon identification data, multiplying the first electronic coupon within a social network of the user, and transferring the first electronic coupon within the social network of the user, start a software application on the coupon holding device based on the first coupon metadata of the first electronic coupon, the software application being configured to generate, based on the information included in the first coupon metadata, an input mechanism into the coupon holding device for receiving an indication of an action by the user, the action by the user including the at least one of linking the personal identification of the user to the coupon identification data, multiplying the first electronic coupon within the social network of the user, and transferring the first electronic coupon within the social network of the user, receive the indication of the action by the user, modify the redemption value of the first electronic coupon from a first redemption value to at least a second redemption value based on the indication of the action by the user, generate second coupon metadata based on the second redemption value, generate a second electronic coupon based on the first electronic coupon and the second coupon metadata, generate a first representation for the second electronic coupon, the first representation being in an electronic data format compatible with near field communication (NFC), generate, after generating the first representation that is in the electronic data format compatible with NFC, a second representation for the second electronic coupon, the second representation being in a barcode format and being different from the first representation, transmit the second electronic coupon in the first representation, which is in the electronic data format compatible with NFC, to a redemption device, which is external to the coupon holding device, divide, after generating the first representation, which is in the electronic data format compatible with NFC, for the second electronic coupon, the second electronic coupon into multiple fragments, in response to the second electronic coupon being in a particular type of second representation, and sequentially transmit the multiple fragments of the second electronic coupon in the second representation, which is in the barcode format, to the redemption device, when no acknowledgement of successful receipt is received by the coupon holding device directly from the redemption device after transmitting the second electronic coupon in the first representation, which is in the electronic data format compatible with NFC, to the redemption device.

6. A system for generating an electronic coupon comprising:

a first server configured to generate a first electronic coupon and to transmit the first electronic coupon; and a coupon holding device including circuitry configured to
  receive the first electronic coupon,
  generate first coupon metadata for the first electronic
    coupon, the first coupon metadata including information indicating that a redemption value can be
    modified by performing at least one of linking a
    personal identification of a user to the coupon identification data, multiplying the first electronic coupon
    within a social network of the user, and transferring
    the first electronic coupon within the social network
    of the user,
  start a software application on the coupon holding
    device based on the first coupon metadata of the first
    electronic coupon, the software application being
    configured to generate, based on the information
    included in the first coupon metadata, an input
    mechanism into the coupon holding device for
    receiving an indication of an action by the user, the
    action by the user including the at least one of linking
    the personal identification of the user to the coupon
    identification data, multiplying the first electronic
    coupon within the social network of the user, and
    transferring the first electronic coupon within the
    social network of the user,
  receive the indication of the action by the user,
  modify the redemption value of the first electronic
    coupon from a first redemption value to at least a
    second redemption value based on the indication of
    the action by the user,
  generate second coupon metadata based on the second
    redemption value,
  generate a second electronic coupon based on the first
    electronic coupon and the second coupon metadata,
  generate a first representation for the second electronic
    coupon, the first representation being in an electronic
    data format compatible with near field communication (NFC),
  generate, after generating the first representation that is
    in the electronic data format compatible with NFC,
    a second representation for the second electronic
    coupon, the second representation being in a barcode
    format and being different from the first representation,
  transmit the second electronic coupon in the first representation, which is in the electronic data format
    compatible with NFC, to a redemption device, which
    is external to the coupon holding device,
  divide, after generating the first representation, which is
    in the electronic data format compatible with NFC,
    for the second electronic coupon, the second electronic coupon into multiple fragments, in response to
    the second electronic coupon being in a particular
    type of second representation, and
  sequentially transmit the multiple fragments of the
    second electronic coupon in the second representation, which is in the barcode format, to the redemption device, when no acknowledgement of successful
    receipt is received by the coupon holding device
    directly from the redemption device after transmitting the second electronic coupon in the first representation, which is in the electronic data format
    compatible with NFC, to the redemption device.

7. The system according to claim 6, further comprising a second server, wherein the first server is configured to receive a distribution channel identification for distributing the second electronic coupon and to generate the second coupon metadata based on the distribution channel identification, and wherein the second server is configured to derive the distribution channel identification after redemption of the second electronic coupon.

8. The system according to claim 7, wherein the second server is further configured to evaluate the effectiveness of the distribution channel based on the distribution channel identifications derived after redemption.

9. The system according to claim 6, wherein the first server comprises coupon metadata generation circuitry.

10. The system according to claim 6, further comprising a second server, wherein the second server is configured to evaluate the second coupon metadata after redemption of the second electronic coupon.

11. A non-transitory computer readable storage medium including computer executable instructions, wherein the instructions, when executed by a computer, cause the computer to execute a method for generating an electronic coupon, the method comprising:
  generating coupon identification data;
  generating first coupon metadata, the first coupon metadata including a redemption value and information
    indicating that the redemption value can be modified by
    performing at least one of linking a personal identification of a user to the coupon identification data,
    multiplying a first electronic coupon within a social
    network of the user, and transferring the first electronic
    coupon within the social network of the user;
  generating the first electronic coupon based on the coupon
    identification data and based on the first coupon metadata;
  starting a software application on the computer based on
    the first coupon metadata of the first electronic coupon,
    the software application generating, based on the information included in the first coupon metadata, an input
    mechanism into the computer for receiving of an indication of an action by the user, the action by the user
    including the at least one of linking the personal
    identification of the user to the coupon identification
    data, multiplying the first electronic coupon within the
    social network of the user, and transferring the first
    electronic coupon within the social network of the user;
  receiving the indication of the action by the user;
  modifying the redemption value of the first electronic
    coupon from a first redemption value to a second
    redemption value based on the indication of the action
    by the user;
  generating second coupon metadata based on the second
    redemption value;
  generating a second electronic coupon based on the
    coupon identification data of the first electronic coupon
    and based on the second coupon metadata;
  generating a first representation for the second electronic
    coupon, the first representation being in an electronic
    data format compatible with near field communication
    (NFC);
  generating, after generating the first representation that is
    in the electronic data format compatible with NFC, a
    second representation for the second electronic coupon,
    the second representation being in a barcode format and
    being different from the first representation;
  transmitting the second electronic coupon in the first
    representation, which is in the electronic data format
    compatible with NFC, to a redemption device, which is
    external to the computer;
  dividing, after the generating of the first representation,
    which is in the electronic data format compatible with
    NFC, for the second electronic coupon, the second electronic coupon into multiple fragments, in response to the second electronic coupon being in a particular type of second representation; and sequentially transmitting the multiple fragments of the second electronic coupon in the second representation, which is in the barcode format, to the redemption device, when no acknowledgement of successful receipt is received by the computer directly from the redemption device after transmitting the second electronic coupon in the first representation, which is in the electronic data format compatible with NFC, to the redemption device.

\* \* \* \* \*